United States Patent
Asthana (10) Patent No.: US 11,055,812 B1
(45) Date of Patent: Jul. 6, 2021

(54) OPPORTUNISTIC LAUNCH OF IDEMPOTENT GEOMETRY STAGE RENDER OPERATIONS

(71) Applicant: Apple Inc., Cupertino, CA (US)

(72) Inventor: Subodh Asthana, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/883,114

(22) Filed: May 26, 2020

(51) Int. Cl.
*G06T 1/20* (2006.01)

(52) U.S. Cl.
CPC ..................................... *G06T 1/20* (2013.01)

(58) Field of Classification Search
CPC ....... G06T 1/20; G06T 15/005; G06F 3/1438; G06F 9/38; G06F 9/3851; G06F 9/3853; G06F 9/3887; G06F 9/3889; G06F 9/3895
USPC .......................................... 345/501, 506, 522
See application file for complete search history.

(56) References Cited

U.S. PATENT DOCUMENTS

| | | | | |
|---|---|---|---|---|
| 2008/0303835 | A1* | 12/2008 | Swift | ................. G06T 15/005 345/522 |
| 2013/0127891 | A1* | 5/2013 | Kim | ...................... G06T 11/60 345/582 |
| 2014/0184623 | A1* | 7/2014 | Frascati | .................. G06T 1/20 345/522 |
| 2015/0348306 | A1 | 12/2015 | Yang | |
| 2015/0379672 | A1 | 12/2015 | Wang | |
| 2016/0055608 | A1* | 2/2016 | Frascati | .................. G06T 1/20 345/522 |
| 2016/0077896 | A1* | 3/2016 | Bolz | ...................... G06F 9/54 719/328 |
| 2016/0240000 | A1 | 8/2016 | Fishwick | |
| 2016/0358307 | A1 | 12/2016 | Brothers | |
| 2017/0103567 | A1 | 4/2017 | Peterson | |

OTHER PUBLICATIONS

Arnau, Jose-Maria, et al., "Parallel Frame Rendering: Trading Responsiveness for Energy on a Mobile GPU," Proceedings of the 22nd International Conference on Parallel architectures and compilation techniques, Oct. 2013.

* cited by examiner

*Primary Examiner* — Jacinta M Crawford
(74) *Attorney, Agent, or Firm* — Blank Rome LLP (57) ABSTRACT

A method comprises obtaining a first plurality of render commands comprising at least a geometry stage and a fragment stage. An identification may be made as to which of the geometry stages of the first plurality of render commands are idempotent. Dependency information is determined for the first plurality of render commands, e.g., identifying and labeling both "true" and "artificial" dependencies between the stages of the commands. The first plurality of render commands may be encoded and executed by a graphics processing unit (GPU) according to a labeled execution graph generated based on the dependency information. During execution, the GPU may attempt to "opportunistically" launch at least one identified idempotent geometry stage command for which at least one artificial barrier still remains. If the opportunistically-launched geometry stage work fails, the work may be discarded, and the method may wait until all barriers have been met before attempting to relaunch it.

20 Claims, 7 Drawing Sheets

OPPORTUNISTIC LAUNCH OF IDEMPOTENT GEOMETRY STAGE RENDER OPERATIONS

TECHNICAL FIELD

This disclosure relates generally to the field of graphics processing. More particularly, but not by way of limitation, this disclosure relates to improving the parallelism and reducing the overall latency of the execution of commands sent to a graphics processing unit for execution.

BACKGROUND

Computers and other computational devices typically have at least one programmable processing element that is generally known as a central processing unit (CPU). They frequently also have other programmable processors that are used for specialized processing of various types, such as processors for graphic processing operations, which are typically called graphic processing units (GPUs). GPUs generally comprise multiple cores, each designed for executing the same instruction or types of instructions on parallel data streams, making them more effective than general-purpose CPUs for algorithms in which processing of large blocks of data is done in parallel. In general, a CPU functions as the "host" entity, handing off more specialized processing tasks (e.g., parallelized graphics tasks) to the GPU.

Graphics commands generated by the CPU are communicated to the GPU for execution. In order to expedite the execution time of the graphics commands, the idle time of the GPU hardware may be reduced by selecting a proper order of commands for execution. However, adopting a proper order for the execution of graphics commands on the GPU may prove difficult, especially when multiple graphics commands have multiple types of dependencies (also referred to herein as "barriers") on each other, e.g., based on different stages of work to be performed by such graphics commands.

One example of a type of dependency that may exist between graphics commands will be referred to herein as a "true" dependency. One example of a true dependence is a so-called "Read After Write" or "RAW" dependency. Other examples of true dependencies may include: "Write after Write" or "WAW" dependencies; or particular API-enforced orderings, e.g., as requested by a user/programmer. Such dependencies or barriers between graphics commands may also be referred to herein as true "barriers." In a RAW dependency, a first command may be writing into a first resource as part of its operation, and a second command may need to read from the same first resource as part of its operation. As may now be appreciated, the read operation of the second command should only happen after the write operation of the first command takes place, in order to avoid the second command reading the wrong information out of memory (e.g., either a previously-written value in the memory, junk values written into the memory, or an incomplete result having been written into memory by the first command).

In other instances, the dependencies or barriers between graphics commands may be referred to herein as "artificial" barriers. Artificial barriers may be created in a system due to various causes, e.g., the software and/or hardware requirements that are inherent to a given implementation. As will be explained in greater detail herein, some graphics render commands may comprise both a geometry stage (also sometimes referred to as a vertex stage) and a fragment stage (also sometimes referred to as a pixel stage). More particularly, geometry stage commands may be used to generate a list of primitives (e.g., dots, triangles, stripes, etc.) that are then processed (or "consumed") by the fragment stage commands. In some cases, for the submission of a fragment stage command to the GPU, the corresponding geometry command that the fragment command depends on must first be completely processed. The geometry stage of a given render command itself may be held up from execution by a dependency inherited from the geometry stage of some previous render command, e.g., if there was a true dependency between the fragment stage of a given render command and a previous render command. In other words, such a geometry stage may be facing an artificial barrier to its execution.

What is needed, then, is a scheme to improve the parallelism and reduce the overall latency of the execution of commands sent to a GPU for execution, e.g., by recognizing and labeling artificial barriers between render commands and attempting to opportunistically launch certain geometry stages of such render commands that are facing only artificial barriers, i.e., as soon as any true dependencies have been satisfied, thereby allowing additional progress and parallelism of the GPU in such situations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a method comprises: obtaining a first plurality of render commands, wherein each render command comprises at least a geometry stage and a fragment stage. In some embodiments, each render command may be decomposed into two or more distinct stages, e.g., a geometry stage and a fragment stage. In such embodiments, it is possible that a given render command "as a whole" may have a first set of dependencies, whereas the individual stages that the given render command is decomposed into may have their own distinct sets of dependencies. For example, if a given render command is determined to be dependent on five other commands (which could be render commands or even other types of commands, such as compute commands), it may be the case that the geometry stage of the given render command is only dependent on two other commands (or maybe even only a single decomposed stage of each of the two other commands), while the fragment stage of the given render command is, in fact, dependent on all five other commands (or at least one or more decomposed stages of each of the five other commands).

Once each render command has been decomposed into stages, one or more processing operations may be performed to determine dependency information. For example, an identification may be made as to which of the geometry stages of the first plurality of render commands are "idempotent," that is, may be executed more than one time without producing different results. Next, the dependencies (or barriers) between the various stages of the commands in the execution graph may be identified and labeled, e.g., as true barriers or artificial barriers based, at least in part, on the execution graph and the identification of the idempotent geometry stages. In some cases, one or more determined dependencies may be culled (e.g., a given dependency could be culled as redundant or irrelevant if the command on which a currently-processing command depends has already been executed, i.e., there is no point in encoding such a dependency because it is trivially met). An execution graph may then be determined based on the dependency information and the labeled barriers. Finally, the first plurality of render commands may be encoded for execution and launched by a GPU, according to the execution graph.

During such execution, the GPU may attempt to opportunistically launch at least one identified idempotent geometry stage that has had all of its true barriers met, but for which at least one artificial barrier still remains unmet. If the opportunistically-launched geometry stage work completes without issue (e.g., no out of memory errors are raised), then the method of executing the first plurality of render commands may continue as normal, with the added benefit of the earlier completion of the aforementioned opportunistically-launched geometry stage work. If instead, the opportunistically-launched geometry stage work fails for some reason (e.g., an out of memory error), then the opportunistically-launched work may simply be discarded, and the method may wait until all barriers have been met for the given geometry stage work before attempting to launch it again.

As may now be appreciated, the failure of any of the opportunistically-launched geometry stage work should not present any issues to the overall successful execution of the render commands, since the failed geometry stage work had already been identified as being idempotent (meaning that executing the same work additional times will not change the results ultimately written to memory). In most cases, depending on the opportunistic launch strategy, the overall execution time for the commands will not be affected adversely either, as, even if the opportunistically-launched work fails, the overall execution time should be no worse than if the opportunistic launch of the idempotent geometry stage work was never attempted in the first place. One exemplary opportunistic launch strategy would be to only opportunistically launch geometry stage work when there is no other geometry stage work that already has all of its barriers met. Other opportunistic launch strategies are also possible.

In another embodiment, the method is embodied in computer executable program code and stored in a non-transitory storage device. In yet another embodiment, the method could be implemented on a corresponding computer system and/or portable electronic device.

BRIEF DESCRIPTION OF THE DRAWINGS

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

DESCRIPTION

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming but would nevertheless be a routine undertaking for those of ordinary skill in the design and implementation of signal processing having the benefit of this disclosure.

The terms "a," "an," and "the" are not intended to refer to a singular entity unless explicitly so defined, but include the general class, of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computer system" or "computing system" refers to a single electronic computing device or to two or more electronic devices working together to perform the function described as being performed on or by the computing system. This includes, by way of example, a single laptop, host computer system, wearable electronic device, and/or mobile device (e.g., smartphone, tablet, and/or another smart device). Similarly, a non-transitory machine-readable or computer-readable medium can refer to a single physical medium or a plurality of media that may together contain the indicated information stored thereon. A processor can refer to a single processing element or a plurality of processing elements, implemented either on a single chip or on multiple processing chips.

This disclosure pertains to various techniques for reducing latency and increasing parallelism in the submission of commands (e.g., graphics or computational commands, or micro-commands respectively corresponding to micro-operations of a complex graphics or computational command) to a GPU for execution, as well as increasing GPU efficiency by reducing the amount of time the GPU stays idle while waiting for the next command for execution.

A host CPU may receive commands for execution on the GPU in one or more command queues associated with one or more applications. The host CPU may then perform a dependency analysis to encode the dependencies for dependency graph generation. As will be explained in further detail below, the dependency graph may be used to help resolve dependencies between the fetched commands and determine an order in which the commands (from the one or more command queues) may be executed and/or determine whether any two given commands may be executed in parallel. In some embodiments, the determined dependencies may be further labeled as "true" or "artificial" barriers, as described above, and in further detail below. In some embodiments, one or more dependencies, e.g., trivially-met dependencies, may also be culled from the dependency graph before it is generated.

In some embodiments, the host CPU may then encode the actual commands that are to be launched on the GPU hardware. Next, the host CPU (or GPU firmware, in some implementations) may add the determined dependency information based on the above-described dependency analysis for each incoming command into a data structure and use the information in the data structure to construct and maintain an execution graph indicating an execution order of the commands. For example, the execution graph may be a Directed Acyclic Graph (DAG), with each node representing a command and each edge representing a dependency or a parent-child relationship between the two connected nodes. Next, in implementations wherein the GPU firmware is generating the execution graph, a background thread executing on the GPU's firmware may fetch commands from one or more command queues. The background execution thread may then fetch the encoded dependencies, along with actual command to launch on GPU. In implementations where the host CPU is generating the execution graph, the background execution thread on the GPU firmware may fetch only the actual commands to launch on GPU, e.g., in graph walk-order, from graph data structure of the execution graph. In some embodiments, the background execution thread on the GPU firmware may also perform additional pre-processing operations on the commands that are to be launched on GPU.

According to some embodiments, each command in the execution graph may be associated with a wait count, where the wait count is indicative of the number of (e.g., zero or more) parent commands a particular (child) command depends on. Typically, the particular command can be executed on the GPU after execution of its parent commands has been completed (i.e., wait count=0) or if the particular command does not have any parents (e.g., is a root node where wait count is also zero).

In some embodiments described herein, at least a portion of a command (e.g., the geometry stage operations) may be launched for execution, even if the wait count of the command is not yet zero, assuming that the only dependency barriers remaining for the portion of the command have been labeled as "artificial" barriers and that the portion of the command has been identified as being idempotent. For example, if a given command's true dependency on its parent command only inherits into the given command's fragment stage operations, and the geometry stage operations of the given command are waiting on no such true dependency, then the system may simply attempt to opportunistically launch one or more of the geometry stage operations at a determined time, e.g., at the earliest time that it has been determined that no "true" barriers remain for that portion of the command (i.e., the geometry stage operations, in this example). In other embodiments, the determined time may be determined based on other policies, e.g., a policy directing the system to wait to attempt opportunistic launches until there is no other "non-opportunistic" geometry stage operations ready for launch.

If the opportunistically-launched geometry stage operations fail for any reason or the GPU runs out of memory while performing the opportunistically-launched operations, the GPU hardware (e.g., upon its own determination and/or upon instruction from the software stack) may simply discard the failed work that had already been launched on the GPU and wait for the remaining "artificial" barriers for the geometry stage of the given command to be met before launching the given command's geometry stage operations again. As mentioned above, executing the geometry stage operations multiple times (e.g., in the event of a failed opportunistic launch attempt) will not have any negative consequences on the ultimate output of the work, owing to the fact that the opportunistically-launched operations will have already been identified as being idempotent, prior to the attempts to opportunistically launch them.

As will be detailed herein, the techniques disclosed herein can be employed to reduce dependency stall latency time and improve GPU performance and reduce GPU idle time.

Figure 1:
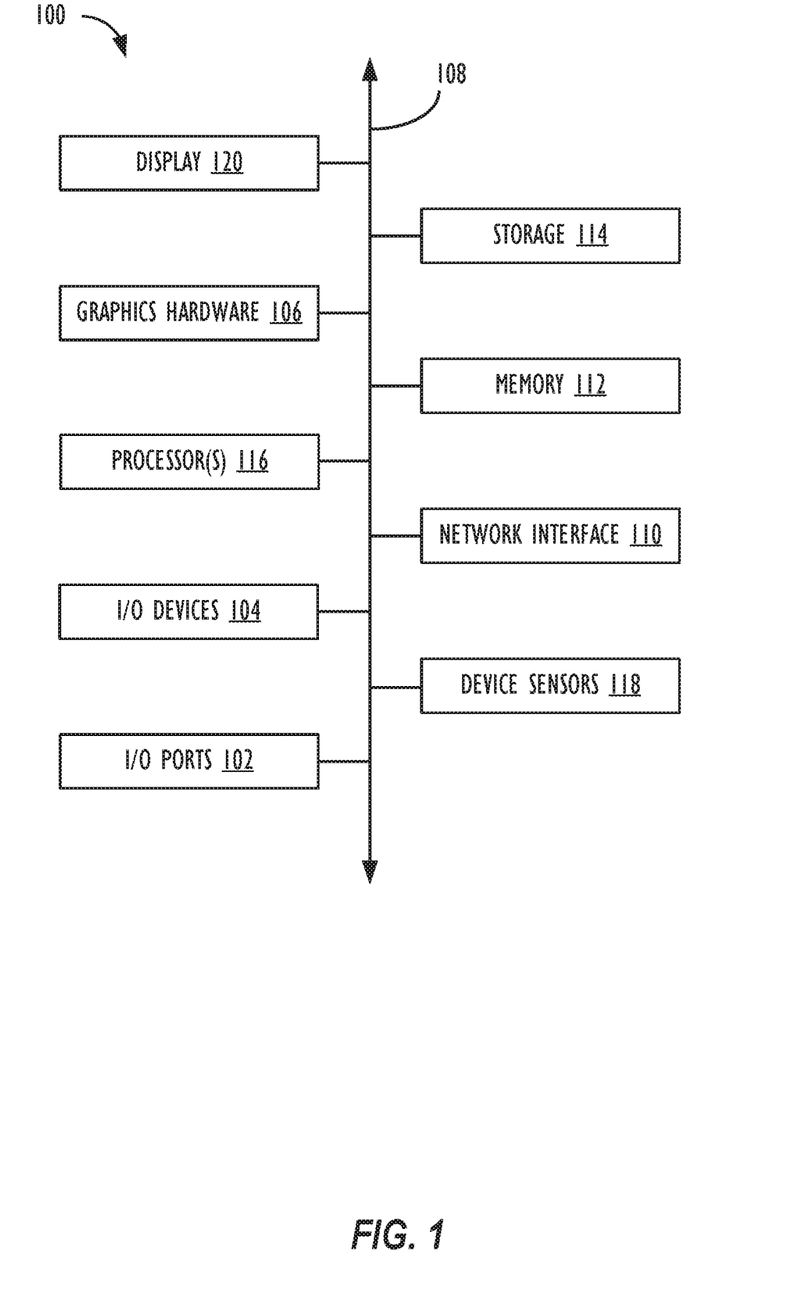
FIG. 1 is a block diagram illustrating a computer system implementing one or more aspects of the disclosed subject matter, according to one or more embodiments.
Figure 2:
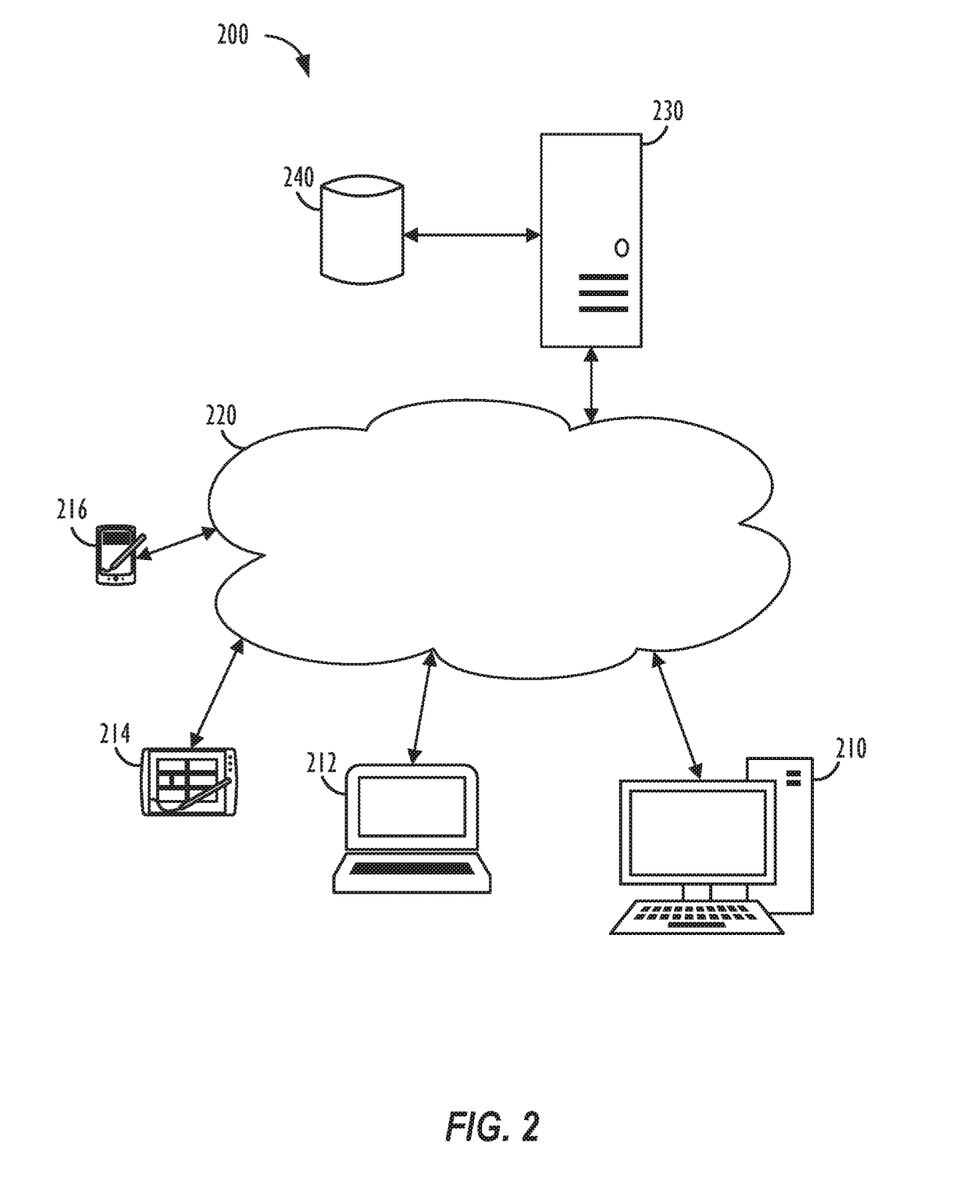
FIG. 2 is a block diagram illustrating a network environment that may be associated with one or more embodiments of the disclosed subject matter.

Turning now to FIG. 1, the disclosed embodiments may be performed by representative computer system 100. For example, representative computer system 100 may act as a software development platform or an end-user device. While FIG. 1 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, smart phones, laptops, tablets, wearables, entertainment systems, other consumer electronic devices, and the like) which have fewer components or perhaps more components, e.g., as shown in FIG. 2, may also be used to implement one or more embodiments.

As illustrated in FIG. 1, computer system 100, which is a form of a data processing system, may include bus 108 which is coupled to processor(s) 116, which may be CPUs and/or GPUs, memory 112, which may include one or both of a volatile read/write random access memory (RAM) and a read-only memory (ROM), and non-volatile storage device 114. Processor(s) 116 may retrieve instructions from memory 112 and storage device 114 and execute the instructions to perform the various operations described herein. Bus 108 interconnects these various components together and also interconnect processor 116, memory 112, and storage device 114 to display device 120, I/O ports 102 and peripheral devices such as input/output (I/O) devices 104, which may include pointing devices, such as a mouse or stylus, keyboards, touch screens, modems, network interfaces, printers and other devices which are well known in the art. Typically, input/output devices 104 are coupled to the system through input/output controller(s).

Computer system 100 may also have device sensors 118, which may include one or more of: depth sensors (such as a depth camera or time-of-flight camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, Global Positioning Systems (GPS), microphones, charge-coupled devices (CCDs) (or other image sensors), infrared sensors, thermometers, etc. These and other sensors may work in combination with one or more GPUs, digital signal processors (DSPs), application specific integrated circuits (ASICs), field programmable gate arrays (FPGAs), or conventional microprocessors, along with appropriate programming, so the sensor outputs may be properly interpreted and/or combined and interpreted.

Device sensors 118 may further capture contextual and/or environmental phenomena such as: time; location information; the status of the device with respect to light, gravity, a magnetic field (e.g., a magnetometer); and even still and video images. In addition, network-accessible information, such as weather information, may also be used as part of the contextual phenomena. All captured contextual and environmental phenomena may be used to provide context to user activity or information about user activity. For example, in accessing a gesture or the expression or emotion of a user, the contextual information may be used as part of the contextual analysis. Computer system 100 may, e.g., react to environmental and contextual actions and reflect a reaction in real-time on the display system through use of graphics hardware 106.

Where volatile RAM is included in memory 112, the RAM is typically implemented as dynamic RAM (DRAM), which requires continuous power in order to refresh or maintain the data in the memory. Graphics hardware 106 may be a special purpose computational hardware for processing graphic and/or assisting processor 116 in performing computational tasks. In some embodiments, graphics hardware 106 may include CPU-integrated graphics and/or one or more programmable GPUs, ASICs, and/or FPGAs.

Storage device 114 is typically a magnetic hard drive, an optical drive, a non-volatile solid-state memory device, or other types of memory systems, which maintain data (e.g., large amounts of data) even after power is removed from the system (i.e., non-volatile). While FIG. 1 shows that storage device 114 is a local device coupled directly to the rest of the components of computer system 100, other embodiments may utilize a non-volatile memory which is remote from system 100, such as a network storage device (e.g., cloud-based storage) which is coupled to system 100 through network interface 110, which may be a wired or wireless networking interface. Bus 108 may include one or more links connected to each other through various bridges, controllers, and/or adapters, as is well known in the art. Although only a single element of each type is illustrated in FIG. 1 for clarity, multiple elements of any or all of the various element types may be used, as desired.

Turning now to FIG. 2, block diagram 200 illustrates a network of interconnected programmable devices, including server 230 and an associated datastore 240, as well as desktop computer system 210, laptop computer system 212, tablet computer system 214, and mobile phone 216 (e.g., smartphone). Any of these programmable devices may be the system shown as computing system 100 of FIG. 1. Network 220 that interconnects the programmable devices may be any type of network, wired or wireless, local or wide area, public or private, using any desired network communication protocol for transport of data from one system to another. Although illustrated as a single network 220, any number of interconnected networks may be used to connect the various programmable devices, and each may employ a different network technology.

In one example, desktop workstation 210 may be a developer system, distributing a graphic application to server 230, which in turn may distribute the graphic application to multiple devices 212, 214, and 216, each of which may employ a different GPU, as well as other different components. Upon launch of the graphic application, one action performed by the application can be creation of a collection of pipeline objects that may include state information, fragment shaders, geometry shaders, and vertex shaders.

Figure 3:
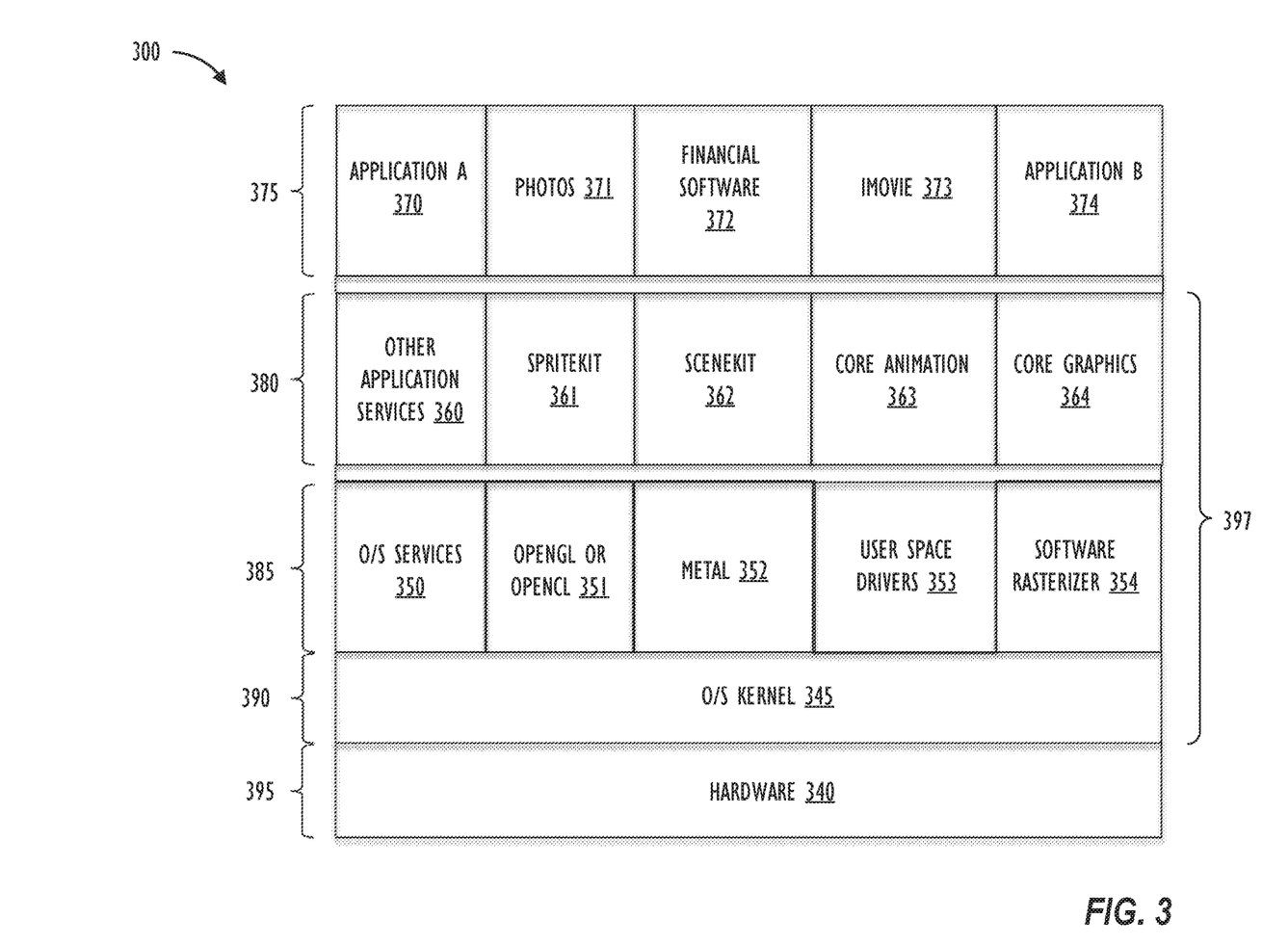
FIG. 3 is a block diagram showing an illustrative software architecture diagram, according to one or more embodiments of the disclosed subject matter.

As noted above, embodiments of the subject matter disclosed herein may include specialized software. As such, a description of common computing software architecture is provided as expressed in layer diagram 300 in FIG. 3. Like the hardware examples, the software architecture discussed here is not intended to be exclusive in any way, but rather to be illustrative. In FIG. 3, the description begins with layers starting with the base hardware layer 395 that includes hardware 340, which may comprise CPUs, GPUs, ASICs, FPGAs or other processing and/or computer hardware. Above the hardware layer is the O/S kernel layer 390, including an example as O/S kernel 345, which is kernel software that may perform memory management, device management, and system calls (often the purview of hardware drivers). The notation employed here is generally intended to imply that software elements shown in a layer use resources from the layers below and provide services to layers above. However, in practice, all components of a particular software element may not behave entirely in that manner.

Returning to FIG. 3, layer 385 is the O/S services layer, exemplified by O/S services 350. O/S services may provide core O/S functions in a protected environment. In addition, O/S services shown in layer 385 may include frameworks for OpenGL® 351, Metal® 352, Software Raytracer 353, and a Pure Software Rasterizer 354 (OpenGL is a registered trademark of Hewlett Packard Enterprise Development LP, and Metal is a registered trademark of Apple Inc.). These particular examples all relate to graphic and/or graphic libraries and are chosen to illuminate the topic of many embodiments herein, which relate to graphics handling. These particular examples also represent graphic frameworks/libraries that may operate in the lower tier of frameworks, such that developers may use shading and graphic primitives and/or obtain fairly tightly coupled control over the graphic hardware. In addition, the particular examples named in layer 385 may pass their work product on directly to hardware or hardware drivers, which is software that is typically tightly-coupled to the hardware.

Referring again to FIG. 3, OpenGL 351 represents an example of a well-known library and application programming interface (API) for graphics rendering including 2D and 3D graphics. Metal 352 also represents a published graphic library and framework, but it is lower level than OpenGL 351, supporting fine-grained, low-level control of the organization, processing, and submission of graphic and computational commands, as well as the management of associated data and resources for those commands. Software Raytracer 353 is software for creating image information based upon the process of tracing the path of light through pixels in the plane of an image. Pure Software Rasterizer 354 refers generally to software used to make graphic information such as pixels without specialized graphic hardware (e.g., using only the CPU). These libraries or frameworks shown within the O/S services layer 385 are only exemplary and intended to show the general level of the layer and how it relates to other software in a sample arrangement (e.g., kernel operations are usually below this layer, and higher-level application services 360 are usually above). In addition, it may be useful to note that Metal 352 represents a published framework/library of Apple Inc. that is known to developers in the art.

Above O/S services layer 385 is an application services layer 380, which includes SpriteKit 361, SceneKit 362, Core Animation 363, and Core Graphics 364. The O/S services layer represents higher-level frameworks that are commonly directly accessed by application programs. In some embodiments of this disclosure the O/S services layer may include graphic-related frameworks that are high level in that they are agnostic to the underlying graphic libraries (such as those discussed with respect to layer 385). In such embodiments, these higher-level graphic frameworks are meant to provide developer access to graphic functionality in a more user- and developer-friendly way and to allow developers to avoid having to work with shading and graphic primitives. By way of example, SpriteKit 361 is a graphic rendering and animation infrastructure made available by Apple Inc. SpriteKit 361 may be used to animate two-dimensional (2D) textured images, or "sprites." SceneKit 362 is a 3D-rendering framework from Apple Inc. that supports the import, manipulation, and rendering of 3D assets at a higher level than frameworks having similar capabilities, such as OpenGL. Core Animation 363 is a graphic rendering and animation infrastructure made available from Apple Inc. Core Animation 363 may be used to animate views and other visual elements of an application. Core Graphics 364 is a two-dimensional drawing engine from Apple Inc. Core Graphics 365 provides 2D rendering for applications.

Above the application services layer 380 is the application layer 375, which may comprise any number and type of application programs. By way of example, FIG. 3 shows three exemplary applications: Photos 371 (e.g., a photo management, editing, and sharing program), Financial Software (e.g., a financial management program), and iMovie 373 (e.g., a movie making and sharing program). Application layer 375 also shows two other generic applications 370 and 374, which represent the presence of any other applications that may interact with or be part of the disclosed embodiments. Generally, embodiments of the disclosed subject matter employ and/or interact with applications that produce displayable/viewable content.

In evaluating O/S services layer 385 and applications services layer 380, it may be useful to realize that different frameworks have higher- or lower-level application program interfaces, even if the frameworks are represented in the same layer of the FIG. 3 diagram. The illustration of FIG. 3 serves to provide a general guideline and to introduce exemplary frameworks. Furthermore, some embodiments may imply that frameworks in layer 380 make use of the libraries represented in layer 385. Thus, FIG. 3 provides intellectual reinforcement for these examples. Importantly, FIG. 3 is not intended to limit the types of frameworks or libraries that may be used in any particular way or in any particular embodiment. Generally, many embodiments of this disclosure propose software activity and architecture in the layers between the hardware 395 and application 375 layers, shown by 397, as well as in the hardware layer itself 395.

With reference again to FIG. 3, some embodiments may suggest the use of higher-level frameworks, such as those shown in application services layer 380. The high-level frameworks may perform intelligent analysis on particular graphic requests from application programs. The high-level framework may then choose a specific hardware and/or a specific library or low-level framework to help process the request. In these embodiments, the intelligent analysis may provide for on-the-fly decision making regarding the best path for the graphic request to follow down to final execution on hardware 340.

Figure 4:
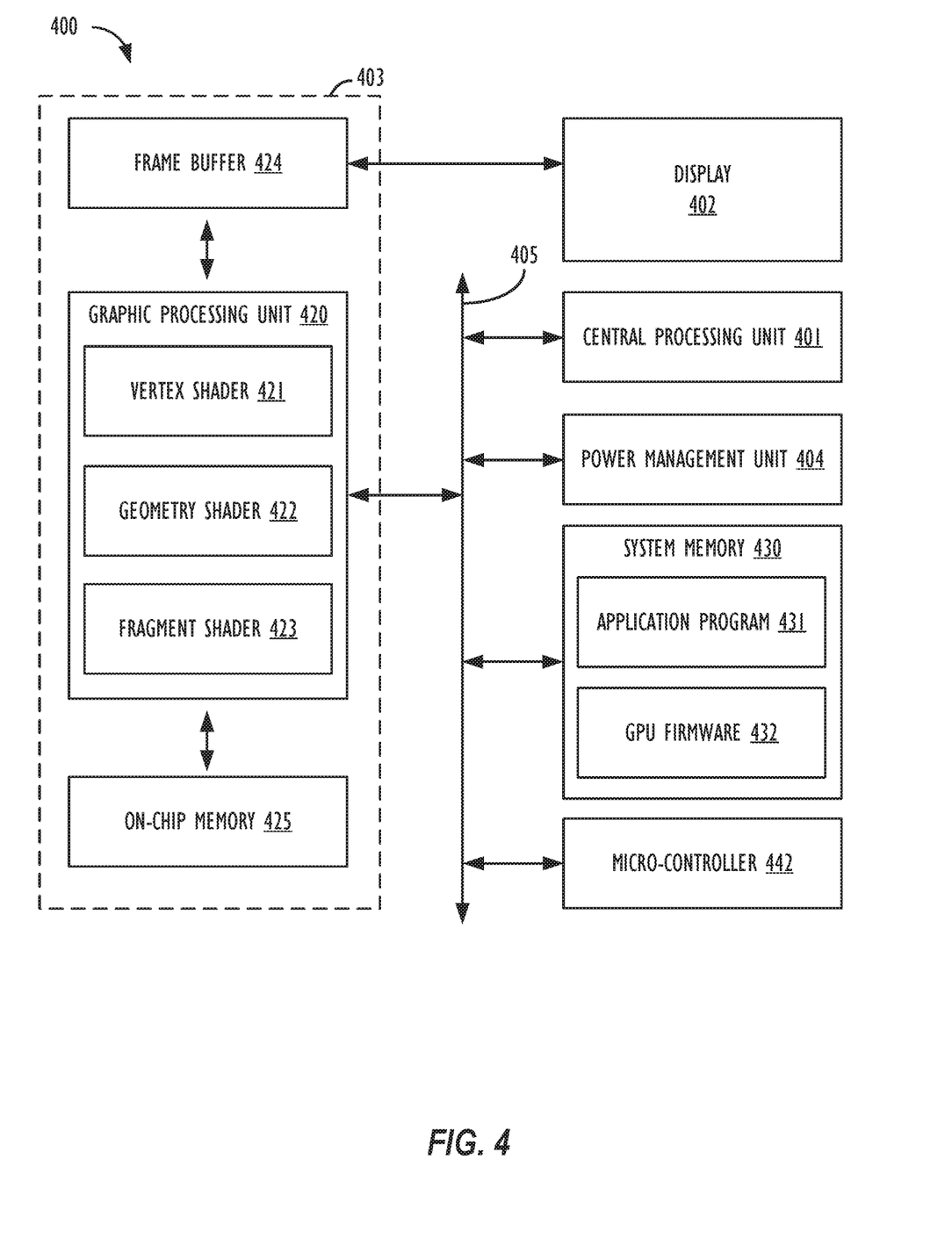
FIG. 4 is block diagram illustrating a computer system implementing one or more aspects of the disclosed subject matter, according to one or more embodiments of the disclosed subject matter.

Referring now to FIG. 4, a block diagram of computing system 400 illustrates a computer system according to one embodiment. Computing system 400 includes CPU 401, graphics processing system 403, display 402, power management unit (PMU) 404, and system memory 430. In the embodiment illustrated in FIG. 4, CPU 401 and graphics processing system 403 are included on separate integrated circuits (ICs) or packages. In other embodiments, however, CPU 401 and graphic processing system 403, or the collective functionality thereof, may be included in a single IC or package.

Data bus 405 interconnects different elements of the computing system 400 including CPU 401, system memory 430, and graphic processing system 403. Data bus 405 may be comprised of one or more switches or continuous (as shown) or discontinuous communication links. In an embodiment, system memory 430 includes instructions that cause CPU 401 and/or graphic processing system 403 to perform the functions ascribed to them in this disclosure. More specifically, graphic processing system 403 can receive instructions transmitted by CPU 401 and processes the instructions to render and display graphic images on display 402.

System memory 430 may include application program 431 and GPU firmware 432. GPU firmware 432 may comprise software for controlling the GPU execution of the graphics (or compute) commands received from CPU 401. GPU firmware 432 may run on micro-controller 442 (e.g., IC, ASIC, FPGA, and the like). In an embodiment, the micro-controller 442 is an integrated circuit comprising a processor core, input/output interface to communicate with data bus 405, memory, and embedded software (i.e., GPU firmware 432). GPU Firmware 432 may be stored on non-volatile memory of the micro-controller 442, or it could be stored on system memory 430, as shown in FIG. 4.

In an embodiment, frame buffer 424 is also located on system memory 430. In another embodiment, application program 431 includes code utilizing one or more application programming interfaces (APIs). APIs can include a predetermined, standardized set of commands that are executed by associated hardware. Application program 431 may generate API commands to render an image by one or more shading engines of GPU 420 for display. GPU firmware (or driver) 432 translates the high-level shading programs into machine code shading programs that are configured for each of the shading engines, e.g., vertex shader 421, geometry shader 422, and/or fragment shader 423 of GPU 420.

Graphics processing system 403 includes GPU 420, on-chip memory 425 and frame buffer 424. In one embodiment, CPU 401 transmits API commands to GPU 420 to render graphic data and store rendered images in frame buffer 424 to be displayed on display 402. In an embodiment, a frame of graphic data is divided into multiple tiles. Each tile may be rendered to on-chip memory 425 space by GPU 420. Upon completion of all tiles of a frame, the frame may be output to frame buffer 424 to display the image, e.g., on display 402.

GPU 420 can include a plurality of cores or functional elements that are configured to execute a large number of threads in parallel. In an embodiment, at least some of the cores are configured as a shading engine that includes one or more programmable shaders. Each shader engine executes a machine code shading program to perform image rendering operations. In an embodiment according to FIG. 4, the shader engines include vertex shader 421, geometry shader 422, and fragment shader 423. In an embodiment, vertex shader 421 handles the processing of individual vertices and vertex attribute data. Unlike vertex shader 421 that operates on a single vertex, the input received by geometry shader 422 are the vertices for a full primitive, e.g., two vertices for lines or stripes, three vertices for triangles, or single vertex for a dot or point. Fragment shader 423 processes a fragment generated (e.g., generated by geometry shader 422) via rasterization into a set of colors and, optionally, depth and/or stencil values.

PMU 404 is responsible of distributing power among different components of computing system 400. Powering-up GPU 420 is part of an initialization operation to prepare GPU 420 for execution of graphics or compute command. In an embodiment, PMU 404 may access power management policies regarding the power consumption of CPU 401 and GPU 420. For example, a workload may be assigned to CPU 401, GPU 420, or the combination of the two. Then, considering the amount of work required by each component, PMU 404 may optimize power distribution to conserve the most energy. In one embodiment, when no workload is assigned to GPU 420 for execution or when GPU 420 is waiting idle for the next workload, PMU 404 may place GPU 420 in sleep mode and provide minimal power to the unit.

Figure 5:
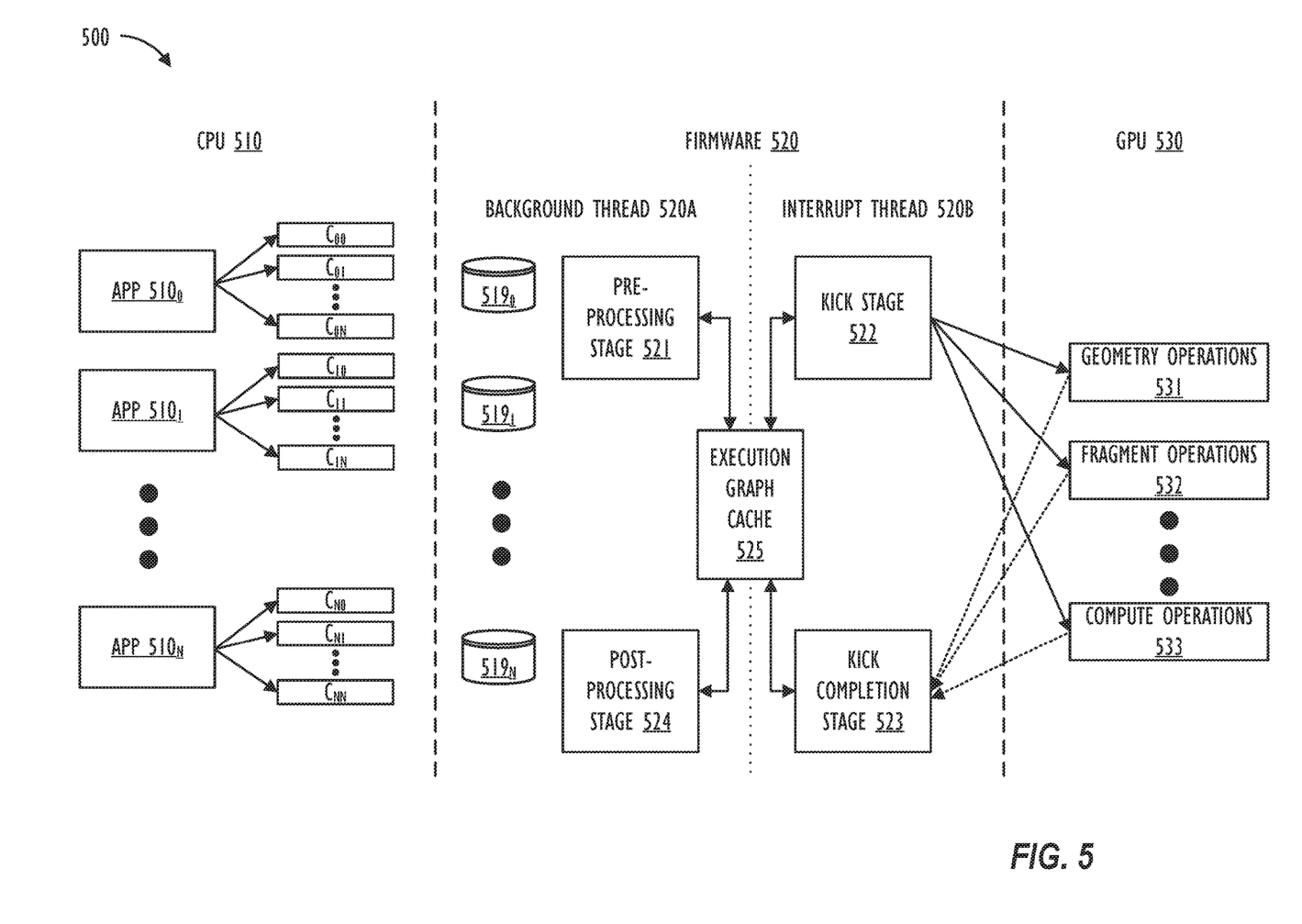
FIG. 5 is a block diagram illustrating the interaction between a CPU, GPU firmware, and a GPU, according to one or more embodiments of the disclosed subject matter.

Referring to FIG. 5, block diagram 500 illustrates the interaction between CPU 510, GPU firmware 520, and GPU 530, according to one embodiment of the disclosure. As discussed above, CPU and GPU are two separate and asynchronous processors. In an embodiment, CPU 510 encodes commands and GPU 530 executes the encoded commands. Firmware 520 controls execution of the graphics (or compute) commands received from CPU 510 on GPU 530. Firmware 520 may comprise instructions stored in a non-volatile memory and executed by a separate micro-controller as previously discussed with reference to FIG. 4. Alternatively, or in addition, firmware 520 could be a custom-designed hardware micro-controller (e.g., ASIC, FPGA, and the like) implementing functionality to minimize latency and improve parallelism in command execution by GPU 530. That is, the features described herein in connection with GPU firmware 520 may be implemented in any suitable combination of hardware and/or software. It is the goal of firmware 520 (or corresponding hardware) to process and schedule commands (received from CPU 510) for execution on GPU 530, such that the idle time of GPU 530 is minimized and artificial barriers between commands may be ignored.

In an embodiment, CPU 510 may, for example, be running a plurality of applications $510_0$-$510_N$. Each of the plurality of applications, for example application $510_0$, may generate a plurality of commands (e.g., $C_{00}$-$C_{0N}$). In one embodiment, CPU 510 may issue instructions and make calls to libraries, APIs, and graphics subsystems to translate the high-level graphics instructions to graphics code (e.g., shader code) executable by GPU 530. The generated commands may be encoded and stored in priority-ordered command queues $519_0$-$519_N$ and communicated to firmware 520. In general, each application may have a set of priority-ordered command queues.

Firmware 520 may obtain commands from command queues $519_0$-$519_N$ and divide each command into one or more micro-operations as part of pre-processing stage 521. In some embodiments, micro-operations may be used to simplify complex instructions or commands into one or more single operation commands (also referred to herein as "micro-command"). Each command or micro-command is then encoded by the command processing pipeline of firmware 520. As shown in FIG. 5, the processing pipeline of a command (or micro-command) from CPU 510 to GPU 530 may involve multiple stages including pre-processing stage 521, kick stage 522, kick completion stage 523, and post-processing stage 524.

In one embodiment, operations corresponding to stages 521-524 may be performed by two separate threads running on GPU firmware 520, e.g., a low-priority background thread 520A and a high-priority interrupt thread 520B. Threads 520A and 520B may be two separate threads running on the same processor. Further, threads 520A and 520B may be two separate threads of execution of firmware 520 allowing the computer system to multitask by switching back and forth between the two threads, enforce differing levels of priority for corresponding tasks, and perform execution of instructions corresponding to the two threads asynchronously. Interrupt thread 520B may have a higher priority than background thread 520A, allowing interrupt thread 520B to halt execution of background thread 520A as needed, and prioritize execution of instructions by interrupt thread 520B.

Actions associated with pre-processing stage 521 and post-processing stage 524 may be performed by background thread 520A, and actions associated with kick stage 522 and kick completion stage 523 may be performed by interrupt thread 520B. That is, background thread 520A may be responsible for operations of the processing pipeline up until the command is inserted into cache memory 525 for execution on GPU 530, and after the command is ready for being flushed from cache memory 525 post command execution on GPU 530. Interrupt thread 520B may be responsible for directly interacting with GPU hardware, submitting commands to GPU 530 for execution at kick stage 522 based on priority and scheduling information, receiving notification from GPU 530 when GPU 530 completes execution of the command and performing operations like edge walking (e.g., traversal) for the completed command at the kick completion stage 523.

As explained previously, commands fetched by firmware 520 from command queues $519_0$-$519_N$ may have various dependencies on each other. As a result, a particular execution order determined based on the dependency must be enforced while executing commands from command queues $519_0$-$519_N$ on GPU 530. One example of a dependency is when data generated by a first command (e.g., graphics or compute command or micro-command) is needed for processing a second command. This is also referred to herein as a Read After Write, or RAW, dependency. As such, GPU 530 may not be able to start execution of the second command until its prerequisite one or more (first) commands are completely processed. Lack of any dependency relationship between any two commands means both commands can be executed in parallel (or in any relative order, e.g., if the hardware is only capable of executing a single command at a time). Conversely, in order to enforce an ordering between two commands, associated dependency must be established. Commands of the same command queue may have dependencies, such that a child command of the queue is dependent upon execution of a parent command of the same queue. Commands belonging to different command queues may also have dependencies between each other.

By way of example, GPU 530 may be performing different operations, such as geometry operations 531, fragment operations 532, and/or compute operations 533. In an embodiment, execution of a fragment command may depend upon data generated from a geometry command. For example, the geometry commands can generate a list of primitives that are then consumed (i.e., processed) by the fragment commands. More specifically, for submission of a fragment command to GPU 530 at kick stage 522 by interrupt thread 520B, the geometry command, which the fragment command depends on, must first be completely processed. Therefore, pre-processing 521, kick 522, and kick completion 523 stage operations of the geometry command must first be completed before the fragment command may be fed to GPU 530 for processing at kick stage 522.

As another example, any two commands executing on GPU 530 could share a texture or surface. As such, a dependency relationship may exist between the two commands, such that a first command (e.g., the producer) writes to the surface and a second command (e.g., the consumer) reads the write by the producer. Therefore, the dependency between the two commands requires the execution of the write command before the execution of the read command, hence the aforementioned "Read After Write" moniker. Thus, it is important to provide a method of resolving such true dependencies between the commands, such that the idle time of GPU 530 is reduced, and its parallelism is maximized.

As described above-identifying whether each dependency is a "true" or "artificial" barrier and labeling the dependencies as such may be two distinct tasks that are performed. According to some embodiments, the dependency analysis and the identification of "true" or "artificial" dependencies may be performed by the host CPU, while the actual execution graph generation using the dependency information and the labeling of the the dependency barriers as true or artificial may be done by either the host CPU or the GPU firmware. Other divisions of labor are also possible in other implementations. As mentioned above, an artificial dependency may exist, e.g., when the geometry stage of a given render command may only be being held up from execution by a dependency inherited from the geometry stage of some previous render command, e.g., if there was a true dependency between the fragment stage of a given render command and a previous render command. Because the geometry stages of render commands may typically be much smaller in size and have faster execution times than the corresponding fragment stages, it is possible that the geometry stages of the render commands could be executed well ahead of the corresponding fragment stages of the render command (e.g., the geometry stage could conceivably be running 10 to 100 render commands ahead of the fragment stage). Thus, according to some embodiments described herein, if the geometry stage operations of a given render command have been identified as being idempotent, and there are no true barriers (e.g., RAW dependencies) remaining unmet for the geometry stage operations of the given render command, then the kick stage 522 may attempt to opportunistically launch such geometry stage operations 531 on GPU 530, that is, launch such geometry stage operations 531, even if there is still an artificial barrier in place for the given geometry stage operations 531. As mentioned above, should the opportunistically-launched geometry stage operations 531 fail for any reason, e.g., an out of memory condition is raised on GPU 530, then GPU 530 may simply discard the work performed by the opportunistically-launched geometry stage operations 531, and wait to launch such work again until all artificial barriers have also been met for the respective geometry stage of the render command. As mentioned above, relaunching the identified geometry stage operations 531 should not, in most cases, have any deleterious effect, since such operations will already have been identified as being idempotent before they could have been designated as a candidate for opportunistic launching. Thus, in such cases, the operational time it takes for GPU 530 to complete the execution of a plurality of render commands is the same as in a situation that does not use the opportunistic launching technique. In other cases, though, gains in performance time and/or reductions in GPU idle time may be obtained by opportunistically launching some geometry stage operations earlier than they otherwise would be, i.e., without the benefits of the teachings of this disclosure.

As shown in FIG. 5, the present techniques may employ an execution graph cache 525 to store commands after background thread 520A has completed pre-processing operations at stage 521 for the commands. Pre-processing stage 521 of the processing pipeline of a command may involve one or more operations performed by background thread 520A after the command is encoded by host CPU 510, and put in a command queue (e.g., $519_0$-$519_N$). As described above, in some embodiments, prior to encoding the commands, host CPU 510 may: perform dependency analysis; add and label the types of barriers between the commands based on the dependency analysis; cull any unneeded dependencies; and add the commands (including the labeled dependency information) to a data structure for execution graph generation. In pre-processing stage 521, background thread 520A may fetch the commands from the command queue, along with any corresponding dependency information, and perform any necessary pre-processing operations in order for the command to be ready to be launched on GPU 530. As described above, in other embodiments, e.g., if host CPU 510 is generating the execution graph, then background thread 520A may simply fetch the commands to be launched on GPU 530 in a graph walk-order.

Other operations that may also be performed for the fetched command by background thread 520A at pre-processing stage 521 may include: memory space allocation, resource allocation, scheduling, calling appropriate instructions, determining priority, and cache validations. Although this disclosure predominantly describes operations of pre-processing stage 521 and post-processing stage 524 being performed by background thread 520A, this may not necessarily be the case. For example, in some embodiments, at least some of the operations of pre-processing stage 521 and post-processing stage 524 may be performed by host CPU 510 and/or interrupt thread 520B, if so desired.

Figure 6:
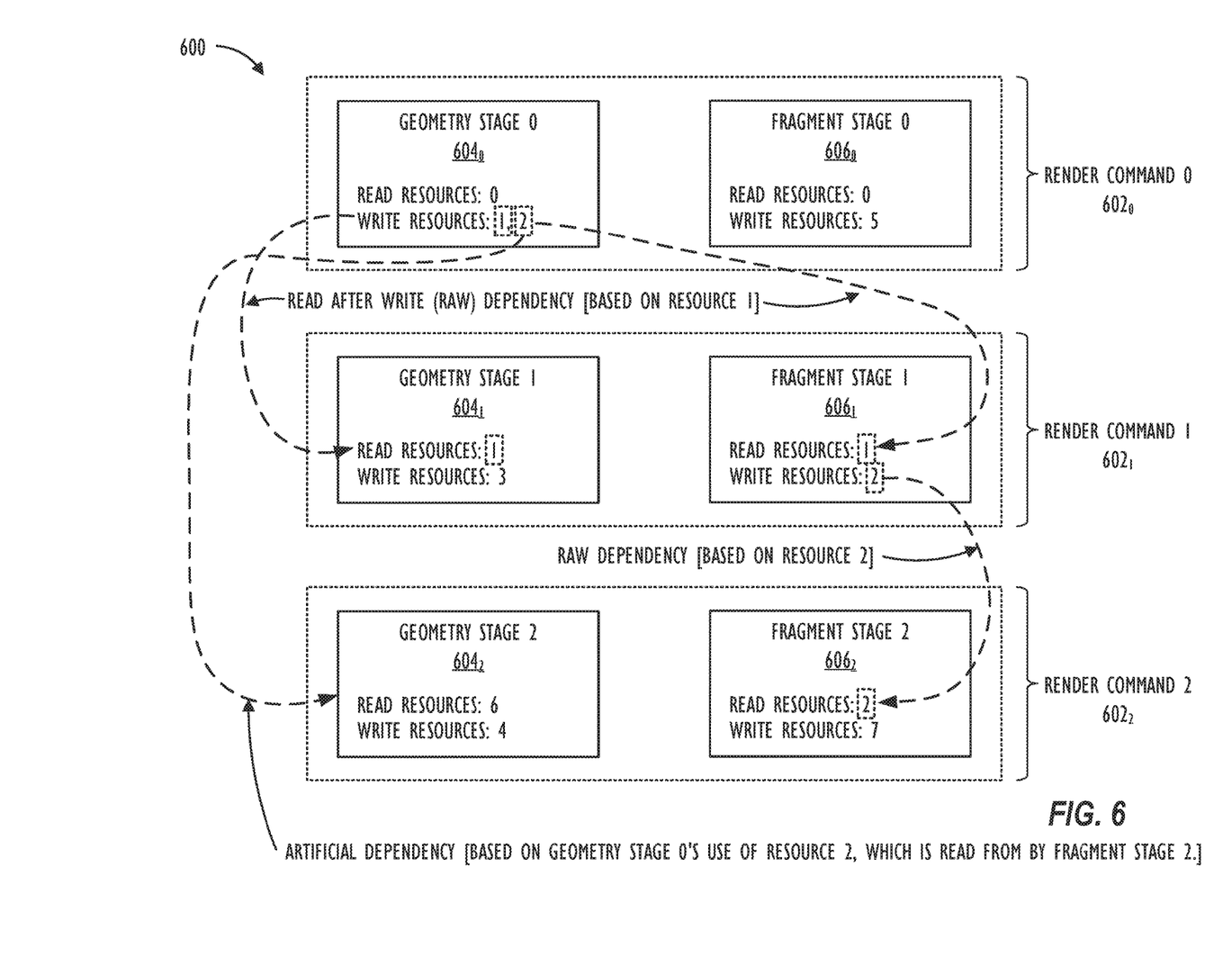
FIG. 6 is a block diagram illustrating the dependencies between the geometry and fragment stages of exemplary render commands, according to one or more embodiments of the disclosed subject matter.

Turning now to FIG. 6, a block diagram 600 illustrating the dependencies between the geometry stages $604_X$ and fragment stages $606_X$ of exemplary render commands $602_X$ is shown, according to one or more embodiments of the disclosed subject matter. Illustrative example 600 includes three exemplary render commands: $602_0$, $602_1$, and $602_2$. Each of the exemplary render commands 602 comprise at least two stages of operation, i.e., the aforementioned geometry stages $604_X$ and fragment stages $606_X$. Typically, the geometry stage commands are producers of information that may then be consumed by a fragment stage command. In some embodiments, the GPU architecture may be "tile-based," meaning that the fragment stages operate on a per-tile basis (e.g., according to some embodiments, an image frame may be broken down into 16 tiles in a 4×4 grid arrangement, with the understanding that many other tile arrangements and sizes are also possible). Because of this tile-based architecture, each tile needs to know which geometries overlap with its bounds before it can successfully render the pixels associated with the respective tile.

Each render command that is send to a GPU for execution may read into or write from a number of resources in memory (e.g., textures, surfaces, state variables, etc.). More particularly, each stage of operations in a given render command may have its own set of associated resources. For example, as shown in FIG. 6, render command 0 ($602_0$) has a geometry stage 0 ($604_0$) that reads from hypothetical memory resource 0 and writes to hypothetical memory resources 1 and 2. Meanwhile, the corresponding fragment stage 0 ($606_0$) reads from hypothetical memory resource 0 and writes only to hypothetical memory resource 1. In the example shown in FIG. 6, render command 1 ($602_1$) may be considered a "child" command of render command 0 ($602_0$), in that it has at least one dependency on render command 0 ($602_0$) that must be resolved before it may be sent off for execution on the GPU. Looking in further detail, render command 1 ($602_1$) is illustrated as having geometry stage 1 ($604_1$) that reads from hypothetical memory resource 1 and writes to hypothetical memory resource 3, as well as fragment stage 1 ($606_1$) that reads from hypothetical memory resource 1 and writes to hypothetical memory resource 2. Thus, as illustrated in FIG. 6, there is a "true" dependency barrier between render command 0 ($602_0$) and render command 1 ($602_1$), due to the fact that both the geometry stage 1 ($604_1$) as well as fragment stage 1 ($606_1$) read from the same hypothetical memory resource 1 that the geometry stage 0 ($604_0$) of render command 0 ($602_0$) is writing to. In other words, the work to be performed by both geometry stage 1 ($604_1$) as well as fragment stage 1 ($606_1$) may not be safely launched on the GPU until the geometry stage 0 ($604_0$) of render command 0 ($602_0$) is finished writing to memory resource 1. There is also a Write After Write (WAW) dependency between geometry stage 0 ($604_0$) and fragment stage 1 ($606_1$), based on memory resource 2 (i.e., geometry stage 0 ($604_0$) has to finish writing into memory resource 2 before fragment stage 1 ($606_1$) is allowed to write into it as well). Additionally, there is another RAW dependency between geometry stage 0 ($604_0$) and fragment stage 2 ($606_2$), which will turn out to be the reason why there is an artificial barrier between geometry stage 0 ($604_0$) and geometry stage 2 ($604_2$), as will be described in further detail below.

Moving on to look at render command 2 ($602_2$) in further detail, render command 2 ($602_2$) is illustrated as having geometry stage 2 ($604_2$) that reads from hypothetical memory resource 6 and writes to hypothetical memory resource 4, as well as fragment stage 2 ($606_2$) that reads from hypothetical memory resource 2 and writes to hypothetical memory resource 7. Thus, again, as illustrated in FIG. 6, the fact that fragment stage 2 ($606_2$) reads from the same hypothetical memory resource 2 that both the geometry stage 0 ($604_0$) of render command 0 ($602_0$) and the fragment stage 1 ($606_1$) of render command 1 ($602_1$) are writing to may create an artificial dependency barrier between geometry stage 0 ($604_0$) and geometry stage 2 ($604_2$). In other words, the artificial barrier may unnecessarily prevent geometry stage 2 ($604_2$) from launching while it is waiting for geometry stage 0 ($604_0$) to be ready for execution. However, when viewed at the more granular level illustrated in FIG. 6 (i.e., with render commands decomposed into individual geometry and fragment stages), it may be seen that there is actually no reason, from a true dependency standpoint, that the work of geometry stage 2 ($604_2$) could not be launched in parallel with (or before) geometry stage 0 ($604_0$).

According to some embodiments, upon identification of geometry stage 2 ($604_2$) as being idempotent and determining that all of the true barriers have been met for geometry stage 2 ($604_2$)—even if one or more artificial barriers for geometry stage 2 ($604_2$) still remain unmet, as is the case in the example of FIG. 6—the firmware 520 may attempt to opportunistically launch the work in geometry stage 2 ($604_2$). In such embodiments, the geometry stage 2 ($604_2$) may be launched at the same time (or even prior to) geometry stage 0 ($604_0$). If, for any reason the opportunistically-launched geometry operations fail (e.g., via running out of memory on the GPU), the GPU 530 may simply discard the work performed and wait for the remaining artificial dependencies (i.e., the completion of geometry stage 0 ($604_0$) to be met before attempting to relaunch geometry stage 2 ($604_2$). As may be understood, the same opportunistic launch techniques may be applied to any other geometry stages of commands that have been kicked to GPU 530 for execution that have been identified as being idempotent and as having no true barriers remaining to be met. In some cases, this opportunistic launch scheme may cause the geometry operations 531 to proceed many commands ahead of the fragment operations 532, but, because of the launch conditions imposed by the scheme, this does not pose any dependency problems or read/write hazards—and (assuming that there are no out of memory conditions) actually serves to increase the parallelism of the GPU 530 and decrease the GPU's latency over prior performance levels.

Figure 7:
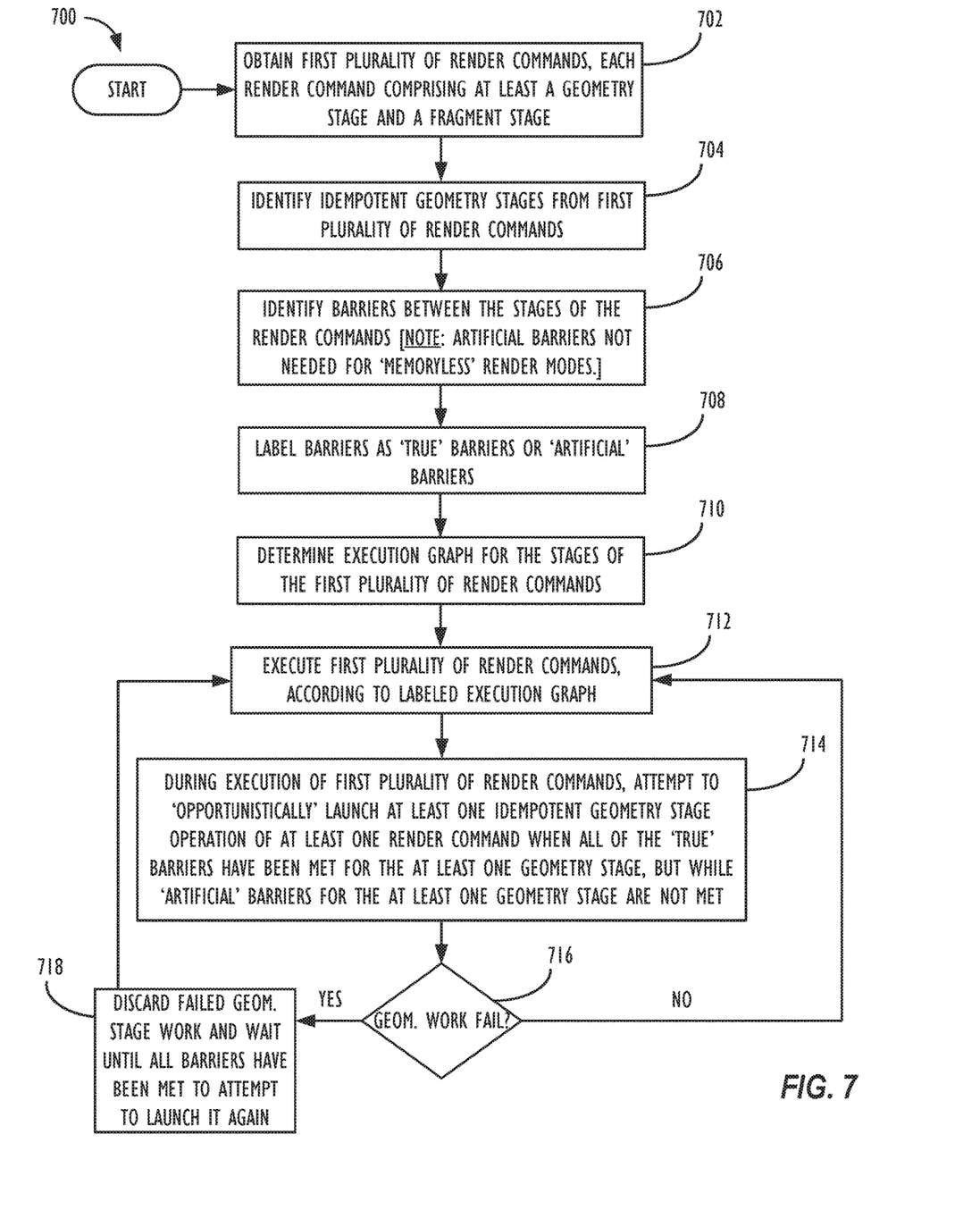
FIG. 7 is a flowchart of an exemplary method of increasing the parallelism of the execution of commands on a GPU through the opportunistic launching of idempotent geometry stage commands, according to one or more embodiments of the disclosed subject matter.

Turning now to FIG. 7, a flowchart 700 of an exemplary method of increasing the parallelism and decreasing the overall latency of the execution of commands on a GPU through the opportunistic launching of idempotent geometry stage commands is shown, according to one or more embodiments of the disclosed subject matter. First, at Step 702, the method may begin by a host CPU obtaining a first plurality of render commands, wherein each render command comprises at least a geometry stage and a fragment stage. In some embodiments, the render commands may be decomposed into two or more distinct portions, e.g., the aforementioned geometry stage and fragment stage, before further processing takes place. Next, at Step 704, the method may identify which of the various geometry stage operations of the first plurality of render commands are idempotent, i.e., meaning that they may be executed multiple times (i.e., serially) without affecting or changing the ultimate result of the work performed by such geometry operations. At Step 706, the method may determine dependency information, e.g., by identifying dependencies, also referred to herein as barriers, between the render commands, e.g., identifying both true and artificial barriers between the various stages of the render commands. Step 706 may also comprise culling one or more irrelevant (e.g., trivially-met) dependencies. At Step 708, the identified barriers may be labeled, e.g., either as "true" barriers or "artificial" barriers.

It is also noted that, in some embodiments, e.g., those employing a so-called "memoryless" render mode (wherein a resource's contents can be accessed only by the GPU and only exist temporarily during a render pass), the identification of "artificial" barriers described in Step 706 may be omitted, because there is no option for the geometry stage to back out of the execution sequence, e.g., should the GPU hit an out of memory condition, and, thus, there is no need to identify any artificial dependencies, e.g., inherited from fragment stages into the corresponding geometry stages of a given command. In such modes, either the geometry stage work will complete successfully, or (e.g., if an out of memory condition is encountered) the image frame will become corrupted and no real rendering will take place anyway. Next, at Step 710, once the host CPU has encoded the first plurality of render commands for execution on a GPU, the method may determine an execution graph (e.g., as discussed above in the context of the exemplary execution graph of FIG. 5) for executing the stages of the first plurality of render commands, which execution graph may be based on the determined dependency information that, e.g., includes labels and stored information regarding the various dependencies that are determined to exist between and among the various stages of the first plurality of render commands. As described above, in some embodiments, the execution graph may be generated by the host CPU, while, in other embodiments, the execution graph may be generated by firmware on the GPU.

At Step 712, the method may begin to fetch, perform any necessary pre-processing operations, and then execute the first plurality of render commands and the various stages associated therewith, according to the labeled execution graph. At Step 714, during the execution of the first plurality of render commands, the method may attempt to opportunistically launch at least one idempotent geometry stage operation of at least one render command when all of the true barriers have been met for the at least one geometry stage, but while artificial barriers for the at least one geometry stage still remain. At Step 716, a determination may be made to see if any of the opportunistically-launched geometry stage operations at Step 714 failed to complete (e.g., due to an out of memory condition). If so, (i.e., "YES" at Step 716), then the method may proceed to Step 718 to cause the GPU to discard the failed geometry stage work and wait until all barriers (including artificial barriers) for the failed work have been met to attempt to launch the work on the GPU again, returning to Step 712 to continue the execution of the first plurality of render commands according to the labeled execution graph. If, instead, none of the opportunistically-launched geometry stage operations at Step 714 failed to complete (i.e., "NO" at Step 716), then the method may simply return to Step 712 to continue the execution of the first plurality of render commands according to the labeled execution graph, with the added benefit of having completed some geometry stage operations earlier than it otherwise would have, i.e., if the artificial barriers had been honored. As will be understood, execution of commands by the GPU, and the performance of method 700, may continue for as long as new fragment and geometry commands are being loaded onto the GPU for execution.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, then presented herein. More generally, if there is hardware support some operations described in conjunction with FIGS. 1-7 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled.

What is claimed is:

1. A method comprising:
    obtaining a first plurality of render commands, wherein each render command comprises at least a geometry stage and a fragment stage;
    identifying one or more idempotent geometry stages from among the geometry stages of the first plurality of render commands;
    determining dependency information for the first plurality of render commands, wherein the dependency information comprises information related to one or more barriers between the geometry and fragment stages of the first plurality of render commands;
    labeling one or more of the barriers as being either a true barrier or an artificial barrier based, at least in part, on the dependency information;
    determining an execution graph based, at least in part, on the determined dependency information and the one or more labeled barriers;
    sending the first plurality of render commands to a graphics processing unit (GPU) for execution, according to the execution graph; and
    during the execution of the first plurality of render commands, launching at least one geometry stage of at least one render command for execution on the GPU, wherein the at least one geometry stage has been identified as being idempotent, and wherein all true barriers for the at least one geometry stage have been met, but at least one artificial barrier for the at least one geometry stage has not been met.

2. The method of claim 1, further comprising:
   determining whether the launched at least one geometry stage completed execution without failure.
3. The method of claim 2, further comprising:
   in response to determining that the launched at least one geometry stage did not complete execution without failure:
   discarding any work produced by the launched at least one geometry stage.
4. The method of claim 3, wherein the at least one geometry stage is relaunched for execution on the GPU upon a determination that all true barriers and all artificial barrier for the at least one geometry stage have been met.
5. The method of claim 1, wherein at least one of the true barriers for the at least one geometry stage comprises a Read After Write (RAW) dependency or a Write After Write (WAW) dependency.
6. The method of claim 1, further comprising:
   culling at least one dependency between stages of the first plurality of render commands prior to determining the execution graph.
7. The method of claim 1, further comprising:
   decomposing each of the first plurality of render commands into a respective one or more geometry stages and one or more fragment stages prior to determining the execution graph.
8. A non-transitory computer readable medium comprising instructions stored thereon that, when executed by one or more processors, cause the one or more processors to:
   obtain a first plurality of render commands, wherein each render command comprises at least a geometry stage and a fragment stage;
   identify one or more idempotent geometry stages from among the geometry stages of the first plurality of render commands;
   determine dependency information for the first plurality of render commands, wherein the dependency information comprises information related to one or more barriers between the geometry and fragment stages of the first plurality of render commands;
   label one or more of the barriers as being either a true barrier or an artificial barrier based, at least in part, on the dependency information;
   determine an execution graph based, at least in part, on the determined dependency information and the one or more labeled barriers;
   send the first plurality of render commands to a graphics processing unit (GPU) for execution, according to the execution graph; and
   during the execution of the first plurality of render commands, launch at least one geometry stage of at least one render command for execution on the GPU, wherein the at least one geometry stage has been identified as being idempotent, and wherein all true barriers for the at least one geometry stage have been met, but at least one artificial barrier for the at least one geometry stage has not been met.
9. The non-transitory computer readable medium of claim 8, wherein the instructions further comprise instruction that, when executed by the one or more processors, cause the one or more processors to:
   determine whether the launched at least one geometry stage completed execution without failure.
10. The non-transitory computer readable medium of claim 9, wherein the instructions further comprise instruction that, when executed by the one or more processors, cause the one or more processors to:
    in response to determining that the launched at least one geometry stage did not complete execution without failure:
    discard any work produced by the launched at least one geometry stage.
11. The non-transitory computer readable medium of claim 10, wherein the instructions further comprise instruction that, when executed by the one or more processors, cause the one or more processors to:
    relaunch at least one geometry stage for execution on the GPU upon a determination that all true barriers and all artificial barrier for the at least one geometry stage have been met.
12. The non-transitory computer readable medium of claim 8, wherein at least one of the true barriers for the at least one geometry stage comprises a Read After Write (RAW) dependency or a Write After Write (WAW) dependency.
13. The non-transitory computer readable medium of claim 8, wherein the instructions further comprise instructions that, when executed by the one or more processors, cause the one or more processors to:
    cull at least one dependency between stages of the first plurality of render commands prior to determining the execution graph.
14. The non-transitory computer readable medium of claim 8, wherein the instructions further comprise instructions that, when executed by the one or more processors, cause the one or more processors to:
    decompose each of the first plurality of render commands into a respective one or more geometry stages and one or more fragment stages prior to executing the instructions to determine the execution graph.
15. A system comprising:
    a graphics processing unit (GPU);
    memory; and
    one or more processors, wherein the memory comprises instructions that, when executed by the one or more processors, cause the one or more processors to:
    obtain a first plurality of render commands, wherein each render command comprises at least a geometry stage and a fragment stage;
    identify one or more idempotent geometry stages from among the geometry stages of the first plurality of render commands;
    determine dependency information for the first plurality of render commands, wherein the dependency information comprises information related to one or more barriers between the geometry and fragment stages of the first plurality of render commands;
    label one or more of the barriers as being either a true barrier or an artificial barrier based, at least in part, on the dependency information;
    determine an execution graph based, at least in part, on the determined dependency information and the one or more labeled barriers;
    send the first plurality of render commands to a graphics processing unit (GPU) for execution, according to the execution graph; and
    during the execution of the first plurality of render commands, launch at least one geometry stage of at least one render command for execution on the GPU, wherein the at least one geometry stage has been identified as being idempotent, and wherein all true barriers for the at least one geometry stage have been met, but at least one artificial barrier for the at least one geometry stage has not been met.

16. The system of claim 15, wherein the instructions further comprise instructions that, when executed by the one or more processors, cause the one or more processors to:
   determine whether the launched at least one geometry stage completed execution without failure.

17. The system of claim 16, wherein the instructions further comprise instructions that, when executed by the one or more processors, cause the one or more processors to:
   in response to determining that the launched at least one geometry stage did not complete execution without failure:
   discard any work produced by the launched at least one geometry stage.

18. The system of claim 17, wherein the instructions further comprise instructions that, when executed by the one or more processors, cause the one or more processors to:
   relaunch at least one geometry stage for execution on the GPU upon a determination that all true barriers and all artificial barrier for the at least one geometry stage have been met.

19. The system of claim 15, wherein at least one of the true barriers for the at least one geometry stage comprises a Read After Write (RAW) dependency or a Write After Write (WAW) dependency.

20. The system of claim 15, wherein the instructions further comprise instructions that, when executed by the one or more processors, cause the one or more processors to:
   cull at least one dependency between stages of the first plurality of render commands prior to determining the execution graph.

* * * * *